Aug. 23, 1955  R. M. DODGE  2,716,033
PIVOTAL JOINT UTILIZING AN END PLAY TAKE-UP WASHER
Filed June 27, 1951
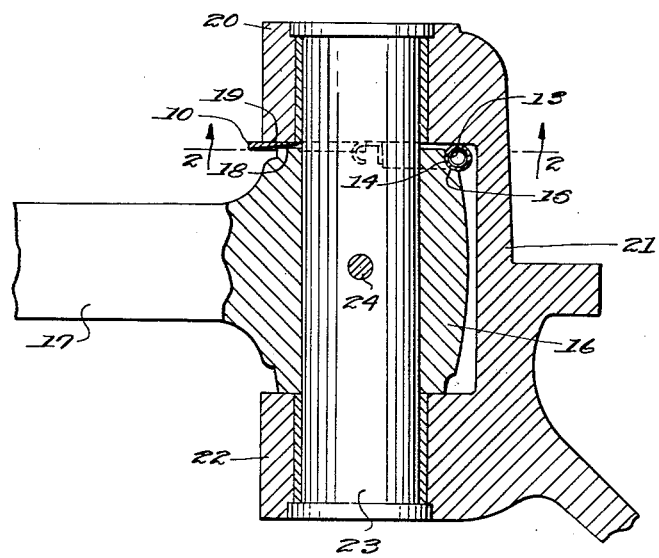
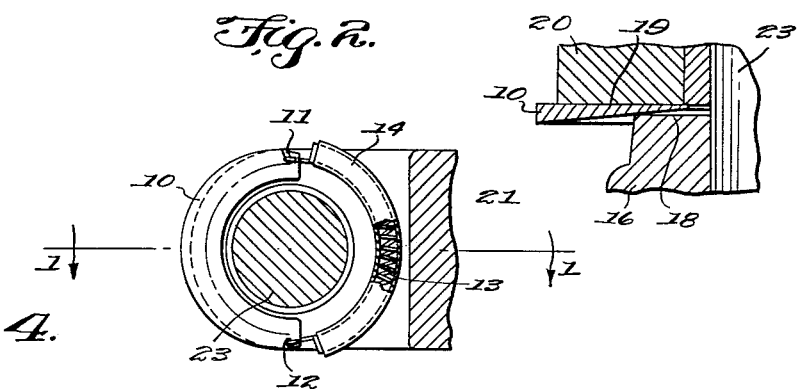
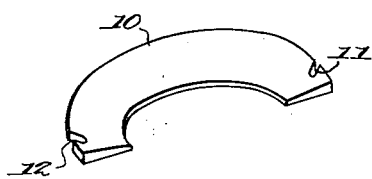
INVENTOR.
Ruez M. Dodge.
BY Victor J. Evans & Co.
ATTORNEYS

United States Patent Office 2,716,033
Patented Aug. 23, 1955

2,716,033

PIVOTAL JOINT UTILIZING AN END PLAY TAKE-UP WASHER

Ruez M. Dodge, Charleston, W. Va.

Application June 27, 1951, Serial No. 233,914

1 Claim. (Cl. 287—100)

This invention relates to pivotal joint utilizing an end play take-up washer device for taking up wear particularly in swivel joints of mechanical devices, and in particular a semi-circular washer, web-shaped in cross section and a spring for urging the washer into the space between the end of a hub of an arm or the like and a mounting yoke or plate for taking up end play resulting from wear between the parts.

The purpose of this invention is to provide means for automatically eliminating end play in swivel connections by continuously drawing a wedge into spaces between parts of a joint.

In numerous swivel joints and particularly in the joint between the spindle arm or radius rod of a steering knuckle that works continuously wear develops between the parts with the result that end play is provided. With this thought in mind this invention contemplates a wedge-like member with a spring extended around the joint and positioned to urge the wedge-like member into the space between the moving parts whereby the wear is taken up continuously with the operation of the joint.

The object of this invention is, therefore, to provide means for mounting a wedge-like member between moving parts of a swivel joint whereby the web-like member is continuously urged into open spaces that develop between wearing surfaces of the parts.

Another object of the invention is to provide a resiliently held wedge-like washer for taking up end play in swivel joints that may be installed in a joint without changing the design or arrangement thereof.

A further object of the invention is to provide a device for taking up end play in swivel joints which is of a simple and economical construction.

With these and other objects and advantages in view the invention embodies a substantially semi-circular washer, wedge-shaped in cross section and having hooks on the ends thereof and a coil spring, the ends of which are secured on the hooks of the washer whereby with the device positioned in a swivel joint the spring urges the washer into an opening that may develop between working parts of the joint.

Other features and advantages of the invention will appear from the following description taken in connection with the drawings wherein:

Figure 1 is a vertical section taken on line 1—1 of Figure 2 showing a wheel spindle pivotally mounted in a yoke with the end play take-up washer installed between one end of the hub on the wheel spindle and a bearing of the yoke.

Figure 2 is a cross section through the upper part of the yoke taken on line 2—2 of Figure 1 and showing the end play take-up washer and spring.

Figure 3 is a detail showing a section through one side of the connection with the wedge-like washer extended between the upper end of the hub of the spindle and upper bearing of the yoke.

Figure 4 is a detail showing the wedge-shaped semi-circular washer.

Referring now to the drawings wherein like reference characters denote corresponding parts the improved end play take-up device of this invention includes a substantially semi-circular washer 10 which is wedge-shape in cross section, as shown in Figure 3, and which is provided with notches 11 and 12 in the ends providing hooks by which the ends of a spring 13 are attached to the washer.

In the design shown the spring 13 is enclosed in a jacket 14 of leather or other suitable material and with the parts arranged in this manner the spring is positioned in a recess 15 that may be provided in the end of a hub 16 of a spindle 17.

With the parts arranged in this manner and with the spring 13 positioned in the recess 15 the washer 10 is continuously urged inwardly into a space between the end 18 of the hub 16 and the end 19 of a bearing 20 on the upper end of a yoke 21 which is also provided with a bearing 22 in which the lower end of the pin 23 is mounted as shown in Figure 1. The hub 16 may be freely mounted on the pin 23 or the hub may be keyed to the pin by a transversely positioned pin or key, such as the pin 24.

With the end of the hub 16 provided with grooves 15 the spring 13 may readily be inserted in the joint and with the washer 10 inserted from the opposite side, wear developing in the joint is continuously taken up whereby a substantially rigid joint is provided continuously.

It will be understood that modifications may be made in the design and arrangement of the parts without departing from the spirit of the invention.

What is claimed is:

In a pivotal joint comprising a yoke having spaced arms and a spindle having a hub with cylindrical end portions received between said arms with slight axial clearance, pin means pivotally connecting said hub portion and yoke arms together, said hub portion and yoke arms having confronting flat faces, the improvement which comprises a substantially semi-annular play take-up member positioned between a pair of said flat faces and tapered from the outside edge to the inner edge, the inner edge of said member having a thickness which is less than the amount of the clearance, the member having an outer thickness which is slightly greater than the amount of clearance, one face of said play take-up member being flat and engaging one of the said flat faces, a coil spring having its ends connected to the end portions of said semi-annular member, at least one end of said coil spring being readily removable or detachable from said member, said coil spring surrounding a part of a cylindrical portion of the hub portion and having an effective cross section of greater size than the amount of clearance whereby the spring will continually urge the play take-up member into the clearance.

References Cited in the file of this patent

UNITED STATES PATENTS

| | | |
|---|---|---|
| 1,597,868 | Pratt | Aug. 31, 1926 |
| 1,721,363 | Wesp | July 16, 1929 |
| 1,825,410 | Monckmeier | Sept. 29, 1931 |
| 2,509,081 | Bluth | May 23, 1950 |
| 2,522,397 | Palmer | Sept. 12, 1950 |
| 2,554,957 | Riblet | May 29, 1951 |
| 2,580,396 | Bluth | Jan. 1, 1952 |

FOREIGN PATENTS

| | | |
|---|---|---|
| 371,473 | Great Britain | Apr. 28, 1932 |